(12) United States Patent
Pulkus

(10) Patent No.: US 9,520,995 B2
(45) Date of Patent: Dec. 13, 2016

(54) EFFICIENT PRIME-NUMBER CHECK

(71) Applicant: GIESECKE & DEVRIENT GMBH, Munich (DE)

(72) Inventor: Jurgen Pulkus, Munich (DE)

(73) Assignee: GIESECKE & DEVRIENT GMBH, Munich (DE)

( * ) Notice: Subject to any disclaimer, the term of this patent is extended or adjusted under 35 U.S.C. 154(b) by 0 days.

(21) Appl. No.: 14/354,455

(22) PCT Filed: Oct. 25, 2012

(86) PCT No.: PCT/EP2012/004477
§ 371 (c)(1),
(2) Date: Apr. 25, 2014

(87) PCT Pub. No.: WO2013/060467
PCT Pub. Date: May 2, 2013

(65) Prior Publication Data
US 2014/0294174 A1   Oct. 2, 2014

(30) Foreign Application Priority Data

Oct. 28, 2011   (JP) .......................... 10 2011 117 236

(51) Int. Cl.
*H04K 1/00*   (2006.01)
*H04L 9/00*   (2006.01)
(Continued)

(52) U.S. Cl.
CPC . *H04L 9/14* (2013.01); *G06F 7/72* (2013.01); *H04L 9/0869* (2013.01); *G06F 7/728* (2013.01); *G06F 2207/7204* (2013.01)

(58) Field of Classification Search
None
See application file for complete search history.

(56) References Cited

U.S. PATENT DOCUMENTS

| 4,405,829 A | 9/1983 | Rivest et al. |
| 6,578,057 B1 * | 6/2003 | Hori ........................ G06F 17/10 380/28 |

(Continued)

FOREIGN PATENT DOCUMENTS

| DE | 102004044453 A1 | 3/2006 |
| EP | 1564649 A2 | 8/2005 |

(Continued)

OTHER PUBLICATIONS

Cheung et al., "A Scalable Hardware Architecture for Prime Number Validation," Field-Programmable Technology Proceedings, IEEE International Conferenece on Bristane, Dec. 6, 2004, pp. 177-184.

(Continued)

*Primary Examiner* — Dede Zecher
*Assistant Examiner* — Trang Doan
(74) *Attorney, Agent, or Firm* — Workman Nydegger

(57) ABSTRACT

In a method for checking whether a value represents a prime number, for a cryptographic application, a Fermat test is carried out, which includes a modular exponentiation of a base with an exponent (e) and a module (m). The exponent (e) and the module (m) respectively depend on the value to be checked, and the modular exponentiation is executed employing Montgomery operations. A device and a computer program product have corresponding features. The method can be particularly efficiently implemented on suitable platforms.

12 Claims, 4 Drawing Sheets

(51) Int. Cl.
*H04L 9/14* (2006.01)
*H04L 9/08* (2006.01)
*G06F 7/72* (2006.01)

(56) References Cited

U.S. PATENT DOCUMENTS

| | | | |
|---|---|---|---|
| 7,983,414 B2 | 7/2011 | Bockes et al. | |
| 8,374,345 B2 | 2/2013 | Vuillaume et al. | |
| 2006/0050868 A1 | 3/2006 | Bockes et al. | |
| 2009/0245507 A1* | 10/2009 | Vuillaume | G06F 7/72 380/28 |
| 2011/0061105 A1* | 3/2011 | Cuypers | G06F 7/72 726/26 |
| 2011/0131424 A1* | 6/2011 | Vigilant | G06F 7/723 713/189 |

FOREIGN PATENT DOCUMENTS

| | | |
|---|---|---|
| EP | 2104031 A2 | 9/2009 |
| JP | 2009258460 A | 11/2009 |
| WO | 2004032411 A1 | 4/2004 |

OTHER PUBLICATIONS

Dorais et al., "A Wieferich Prime Search up to 6.7×1015," Journal of Integer Sequences, Oct. 16, 2011, pp. 1-14, vol. 14, Article 11.9.2.

German Search Report for corresponding German Application No. 102011117236.3, created on Jul. 2, 2012.

International Search Report for corresponding International PCT Application No. PCT/EP2012/004477, mailed Feb. 19, 2013.

Le Masle et al., "Parametric Encryption Hardware Design," Reconfigurable Computing: Architectures, Tools and Applications, Mar. 17, 2010, pp. 68-79.

Montgomery, "Modular Multiplication Without Trial Division," Mathematics of Computation, Apr. 1985, pp. 519-521, vol. 44, No. 170.

Rabin, "Probabilistic Algorithms for Testing Primality," Journal of Number Theory 12, 1980, pp. 128-139, Academic Press Inc.

* cited by examiner

EFFICIENT PRIME-NUMBER CHECK

BACKGROUND

The invention relates in general to the technical field of efficiently implementable cryptographic methods. More precisely, the invention relates to a method for the efficient check whether a value represents a prime number. The invention is particularly suitable for the use in a portable data carrier. Such a portable data carrier can be e.g. a chip card (smart card) in different designs or a chip module or a comparable limited-resource system.

SUMMARY

Efficient methods for ascertaining prime numbers are required for many cryptographic applications. For example, for the key generation in the RSA method described in U.S. Pat. No. 4,405,829 two secret prime numbers must be established, the product thereof forming a part of the public key. The size of these prime numbers depends on the security requirements and normally amounts to several hundred to several thousands of bits. It is expected that the required size will still grow in the future.

Altogether, the prime number search is by far the most computationally intensive step in the RSA key generation. For security reasons it is often required that the key generation is executed by the data carrier itself. Depending on the type of the data carrier, this process may cause an expenditure of time during the production of the data carrier (e.g. the completion or initialization or personalization), which strongly varies and might possibly amount to several minutes. As production time is expensive, the time required for the key generation represents a considerable cost factor. It is therefore desirable to accelerate the key generation and thus to increase the achievable throughput of a production plant for portable data carriers.

An important step for reducing the production time is to employ an efficient method for the prime number search, which further fulfills some boundary conditions with respect to the generated prime numbers. Such methods have already been proposed and are known for example from the laid-open applications DE 10 2004 044 453 A1 and EP 1 564 649 A2.

In RSA methods also the encryption and decryption processes effected after the key generation are relatively computationally intensive. In particular for portable data carriers with their limited computing power there is therefore often used an implementation that employs the Chinese remainder theorem (CRT) for decryption and signature generation and is thus also referred to as RSA-CRT method. By employing the RSA-CRT method the computing expenditure required for decryption and signature generation is reduced by about the factor of 4.

For preparing the RSA-CRT method there are calculated, upon the determination of the private key, further values besides the two secret RAS prime factors and stored as parameters of the private key. For example the laid-open application WO 2004/032411 A1 contains more detailed information about this. Since the calculation of the further RSA-CRT key parameters likewise is normally executed during the production of the portable data carrier, it is desirable to also employ methods that are as efficient as possible therefor.

Many portable data carriers contain coprocessors which support certain calculation processes. In particular, there are known data carriers whose coprocessors support an operation known as Montgomery multiplication, which is described in the article "*Modular multiplication without trial division*" by Peter L. Montgomery, published in *Mathematics of Computation*, Vol. 44, no. 170, April 1985, pages 519-521. It would be desirable to exploit the capabilities of coprocessors that are currently available or will come into the market in the future as well as possible.

Accordingly, it is the object of the invention to provide an efficient technique for the prime number check.

According to the invention, this object is achieved in whole or in part by the independent claims. The dependent claims relate to optional features of some configurations of the invention. The claimed method serves, according to the invention, for cryptographic purposes, i.e. for example for the determination of at least one parameter for an RSA method or an RSA-CRT method or another cryptographic method.

The invention starts out from the basic consideration to execute the modular calculation of power required for a Fermat test (exclusively) employing Montgomery operations—this is understood to mean in particular Montgomery multiplications and Montgomery squarings. Through the invention there arises a considerable gain in efficiency in particular when there is employed a platform which supports in terms of hardware Montgomery operations with the bit lengths required for cryptographic purposes—e.g. through a specific coprocessor.

In many configurations of the invention the modular exponentiation can be written with a positive and integer exponent and a base which is a fractional value with a power of two in the denominator. For example, the base can have the value ½. It is to be understood that modular exponentiations of the stated type can also be written differently, e.g. the modular exponentiation $(½)^e$ mod m equivalent as $2^{-e}$ mod m. But this shall not restrict the scope of protection. In many embodiments the module is equal to the value to be checked.

In some configurations the modular exponentiation is executed in several method segments, in each segment respectively being executed several—e.g. eight—Montgomery squarings of an intermediate result and exactly one Montgomery multiplication of the intermediate result with a factor dependent on the exponent of the modular exponentiation. This factor can be, for example, a power of two or a power of two linked with the module by a suitable operation.

Because of the differences between Montgomery operations and "normal" modular operations, in many embodiments there takes place a recoding which generates a recoded exponent from the usual binary representation of the exponent for the modular exponentiation. In particular, bit groups of the recoded exponent can define the powers of two stated in the preceding paragraph. The recoding can comprise, for example, a subtraction of the original exponent from a value which depends on a Montgomery parameter.

The order of enumeration of the steps in the method claims should not be understood as a restriction of the scope of protection. Rather, there are also provided embodiments of the invention in which these steps are executed wholly or partly in a different order and/or wholly or partly interleaved and/or wholly or partly in parallel.

The computer program product of the invention has program commands, in order to implement the method of the invention. Such a computer program product can be a physical medium, e.g. a semiconductor memory or a disk or a CD-ROM. However, in some embodiments the computer program product can also be a non-physical medium, e.g. a signal conveyed via a computer network. In particular, the computer program product can contain program commands which are incorporated into the portable data carrier in the course of the production thereof.

The device according to the invention can in particular be a portable data carrier, e.g. a chip card or a chip module. Such a data carrier contains in a per se known manner at least one processor, several memories configured according to different technologies and various auxiliary component groups. In the wording of the present document the term "processor" shall comprise main processors as well as coprocessors.

In preferred developments, the computer program product and/or the device have features which correspond to the features mentioned in the present description and/or stated in the dependent method claims.

BRIEF DESCRIPTION OF THE DRAWINGS

Further features, tasks and advantages of the invention can be found in the following description of various exemplary embodiments and alternative embodiments. Reference is made to the schematic drawing.

DETAILED DESCRIPTION OF VARIOUS EMBODIMENTS

In the present document, the invention is described in particular in connection with the determination of one, several, or all the parameters of an RSA-CRT key pair. But the invention is also usable for other application purposes in which relatively large and random prime numbers must be determined. Such application purposes can be, for example, the calculation of a secret RSA key without CRT parameter or the calculation of prime numbers for other cryptographic methods.

In general, the parameters of an RSA-CRT key pair are derived from two secret prime numbers p and q as well as a public exponent e. Here, the public exponent e is a number coprime to the value $(p-1)\cdot(q-1)$, which number can be randomly chosen or firmly specified. For example, in some exemplary embodiments the fourth Fermat prime number $F_4 = 2^{16}+1$ is employed as a public exponent e. The public key contains the public exponent e and a public module $N:=p\cdot q$. The private RSA-CRT key contains, beside the two prime numbers p and q, the modular inverse $p_{inv}:=p^{-1}$ mod q as well as the two CRT exponents $d_p$ and $d_q$, which are defined by $d_p:=e^{-1}$ mod(p-1) and $d_q:=e^{-1}$ mod(q-1).

Figure 1:
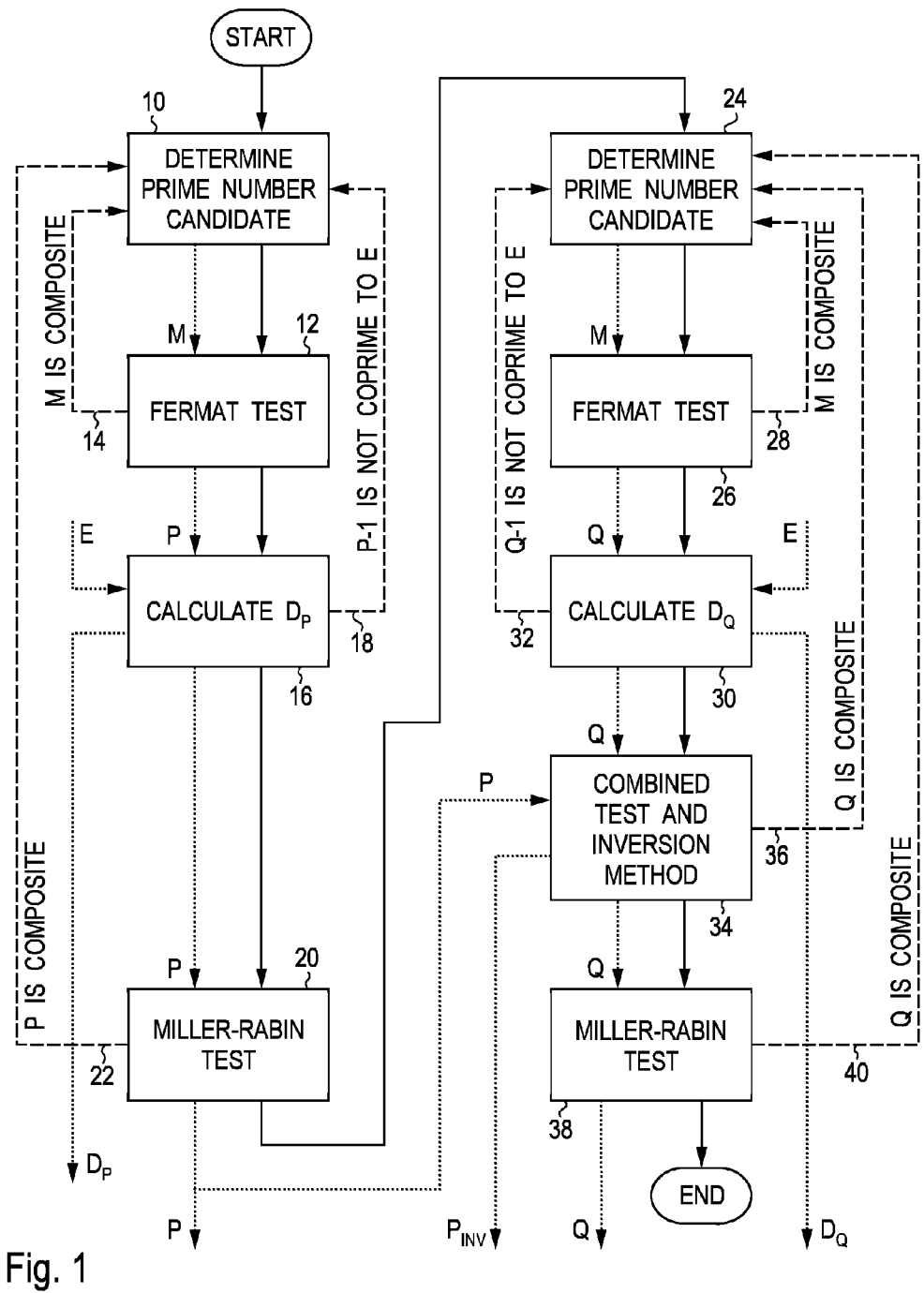
FIG. 1 shows a flow diagram of a method for the determination of two prime numbers as well as further parameters of an RSA-CRT key.

The method according to FIG. 1 shows the calculation of all the parameters of a secret RSA-CRT key with specified public exponent e. The method consists of two parts which are represented in a left and right column of FIG. 1. The first part (steps 10, 12, 16 and 20) comprises the determination of the one prime number p and of the key parameter $d_p$ connected therewith, while the second part (steps 24, 26, 30, 34 and 38) relates to the determination of the other prime number q and of the key parameters $d_q$ and $p_{inv}$.

It is to be understood that in alternative embodiments the method can be modified in such a way that only some of the above-stated parameters are calculated. For this purpose, for example method steps can be omitted or shortened, when some key parameters are calculated otherwise or not needed. It can in particular be provided to execute only one of the two method parts shown in FIG. 1 (i.e. either only the steps 10, 12, 16 and 20 or only the steps 24, 26, 30, 34 and 38), when only one single prime number needs to be determined.

In FIG. 1 and the further drawing figures, the continuous arrows show the regular program flow, and the dashed arrows show alternative program courses, which are executed under certain conditions—in particular when a prime number candidate or a prospective prime number proves to be composite. The dotted arrows illustrate the data flow.

Figure 2:
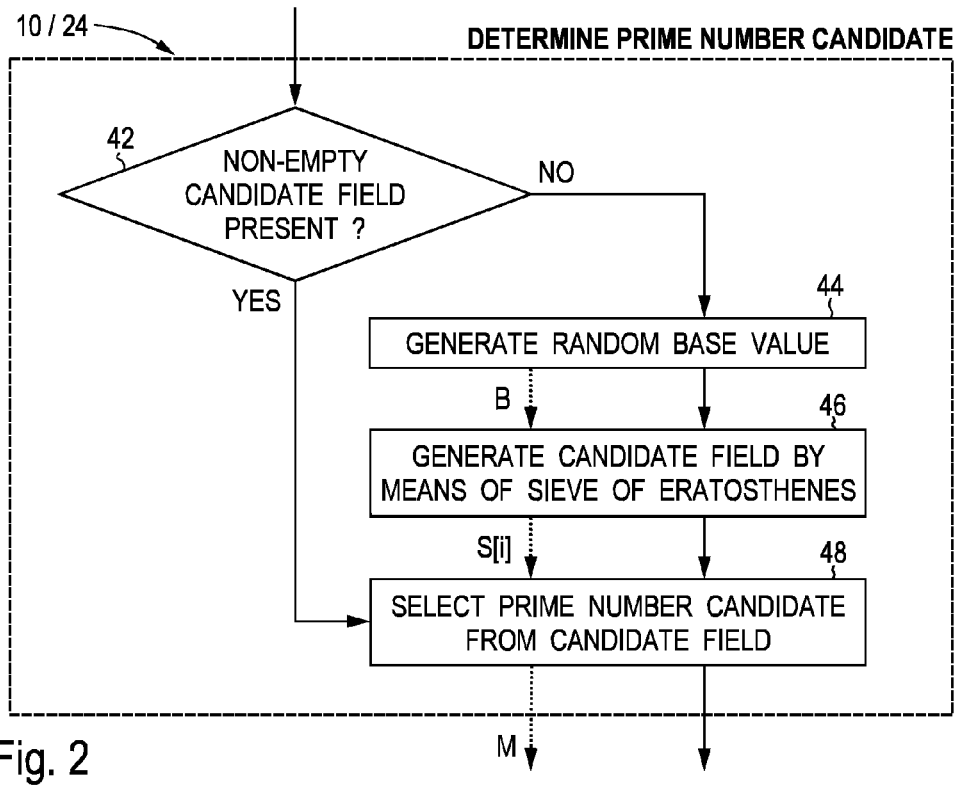
FIG. 2 shows a flow diagram of a method for the determination of a prime number candidate.

The course represented in FIG. 1 starts in step 10 with the generation of a first prime number candidate m which fulfills certain boundary conditions (in particular the boundary condition m≡3 mod 4). In the exemplary embodiments described herein, upon the determination of each prime number candidate m a pre-selection is made, which ensures that the prime number candidate m is not divisible already by a small prime number (e.g. 2, 3, 5, 7, . . . ). A suitable determination method with pre-selection is shown in FIG. 2 and is hereinafter described in more detail.

In step 12 the prime number candidate m is subjected to a Fermat test. The Fermat test is a probabilistic prime number test, which recognizes a composite number as such with a high probability, while a prime number is never falsely regarded as a composite number. The Fermat test is based on Fermat's little theorem, which says, that for each prime number p and each natural number a there applies the relation $a^p \equiv a$ mod p. The inversion does not necessarily apply, but counter-examples are so rare that a prime number candidate m which passes the Fermat test is, with a probability bordering on certainty, a prime number.

If the prime number candidate m is recognized as a composite number in the Fermat test in step 12, a return 14 to step 10 is effected, in which a new prime number candidate is determined. Otherwise, the method is continued, the prime number candidate m being regarded as a prospective prime number p.

In step 16 the CRT exponent $d_p$, which is defined by virtue of $d_p:=e$ mod(p-1), is calculated. For this purpose, a per se known inversion method is employed. The CRT exponent $d_p$ as the modular inverse of the public exponent e exists exactly when e and p-1 are coprime, i.e. when gcd(p-1, e)=1 applies. If this is not the case, a return 18 to the beginning of the method is effected. Otherwise, the CRT exponent $d_p$ is determined in step 16 and the method is then continued in step 20 with a Miller-Rabin test of the prospective prime number p.

The Miller-Rabin test is known as such from the article "*Probabilistic algorithms for testing primality*" by Michael O. Rabin, published in *Journal of Number Theory* 12, 1980, pages 128-138. In each test round of the Miller-Rabin test a composite number is recognized as such with a certain probability, while a prime number is never falsely regarded as a composite number. The error probability of the Miller-Rabin test depends on the number of test rounds and can be kept arbitrarily low by a sufficient number of test rounds being executed.

Due to the high accuracy of the Fermat test in step 12, which has already been mentioned above, the probability that the prospective prime number p is recognized as a composite number in the Miller-Rabin test in step 20 is negligible. The probability that the calculation of the CRT exponent $d_p$ in step 16 fails due to gcd(p−1, e)≠1 and the return 18 must be executed, however, is by orders of magnitude higher. It is thus more efficient to execute the step 16 before step 20, because this avoids unnecessary Miller-Rabin tests. Nevertheless, the invention also comprises exemplary embodiments, in which the CRT exponent $d_p$ is only calculated after the Miller-Rabin test or at a different time. Further, in alternative embodiments it can be provided to execute the calculation of the CRT exponent $d_p$ separated from the method for the ascertainment of prime numbers described herein; the step 16 can then be omitted.

The Miller-Rabin test in step 20 is executed so that a desired maximum error probability, which may amount to for example $2^{-100}$, can be mathematically proven. In the Miller-Rabin test there are executed several test rounds, the number of which depends on this error probability. A test round for the prospective prime number p consists in a random number being raised to the ((p−1)/2)-th power modulo p, and it being checked whether the result is ±1 modulo p. Here, the boundary condition p≡3 mod 4 is assumed.

In the highly improbable case that the prospective prime number p is recognized as a composite number in one of the test rounds of the Miller-Rabin test in step 20, a return 22 to the beginning of the method is effected. Otherwise, the prime number p is output as one of the results of the method described herein.

The second method part, which is shown in the right column of FIG. 1, is, except for step 34, a repetition of the first method part according to the left column of FIG. 1, the second prime number q being calculated. Reference is hence largely made to the explanations above.

The steps 24, 26 and 30 are analogous to the steps 10, 12 and 16. When the prime number candidate m selected in step 24 turns out to be composite upon the Fermat test in step 26, a return 28 is executed to the selection of a new prime number candidate in step 24. Otherwise, the CRT exponent $d_q := e^{-1} \mod(q-1)$ is calculated in step 30. A return 32 to the step 24 is effected, if e and q−1 are not coprime. Otherwise, the method is continued with the prospective prime number q. Similar to the first method part, modifications are provided here too, in which the CRT exponent $d_q$ is calculated at a different time in connection with the method described herein or separated therefrom.

In step 34, a combined test and inversion method is executed, in which a first test round of a Miller-Rabin test for the prospective prime number q is coupled with the calculation of the inverse $p_{inv} := p^{-1} \mod q$. Because q is a prime number, the inverse $p_{inv}$ can be determined by virtue of Fermat's little theorem as $p_{inv} = p^{-1} = p^{q-2} \mod q$. Because p is a random number, upon this calculation there can immediately be executed with little additional effort a first Miller-Rabin test round for the prospective prime number q, it being checked whether the ((q−1)/2)-th power of p modulo q is equal±1.

In step 34, a return 36 to step 24 is effected, if the prospective prime number q does not pass the first Miller-Rabin test round. Otherwise, the further still required test rounds of the Miller-Rabin test are executed in step 38. If one of these test rounds fails, then a return 40 to step 24 is effected for the selection of a new prime number candidate. Otherwise, the second prime number q is known and the method ends.

In some embodiments the method shown in FIG. 1 is modified to that effect, that, instead of the step 36, an additional round of the Miller-Rabin test is executed in step 38. The calculation of the inverse $p_{inv}$ can then be executed as a separate step—as a part of the method described here or separated therefrom —, if such a calculation is required at all. For example, in RSA-CRT calculations the inverse $p_{inv}$ merely serves for increasing the efficiency. In RSA calculations without the use of the Chinese remainder theorem the inverse $p_{inv}$ is not needed.

FIG. 2 illustrates the determination of a prime number candidate m, as it is executed in the steps 10 and 24 of FIG. 1. In the exemplary embodiments described herein, in so doing a candidate field is employed which provides several prime number candidates m. The candidate field can be, for example, a packed bitfield (bit array) S, whose bits S[i] indicate, whether or not a number, which has a shifting relative to a base value b, which shifting is dependent on the bit position i, is a prime number candidate m.

In the method according to FIG. 2, in test 42 it is first checked whether a suitable and non-empty candidate field is present. If this is not the case, in step 44 a random base value b is generated, which fulfills the conditions b≡3 mod 4.

In step 46, then the candidate field is generated. In the present exemplary embodiment, as a data structure for the candidate field a bitfield S is employed, whose bit positions i respectively correspond to a shifting of 4 relative to the base value b. Each bit S[i] of the completed candidate field thus indicates, whether or not the number b+4 can be employed as a prime number candidate m.

For generating the candidate field in step 46, first all bits S[i] are initialized to a first value—e.g. the value "1". Then, according to the principle of the sieve of Eratosthenes, those bits S[i] are changed to a second value—e.g. the value "0"—, which correspond to a number b+4 divisible by a small prime number. The size of the candidate field and the number of sieve iterations are selected such—in dependence on the available memory space—that the average runtime of the overall method is minimized. This is an optimization task the solution of which depends on the relative effort for the pre-selection compared with the effort for a failed Fermat test. For RSA keys with 2048 bit there can be executed, for example, several thousands of sieve iterations, then about 40 Fermat tests being necessary for the determination of one of the prime numbers p and q.

In step 48, finally, a prime number candidate m is selected from the filled candidate field. This selection can be effected for example randomly or according to a specified order. In case of further calls of the method shown in FIG. 2, step 48 is executed directly after the test 42, and further prime number candidates m are selected from the once created candidate field until the field is empty or a specified minimum filling quantity is undershot.

Figure 3:
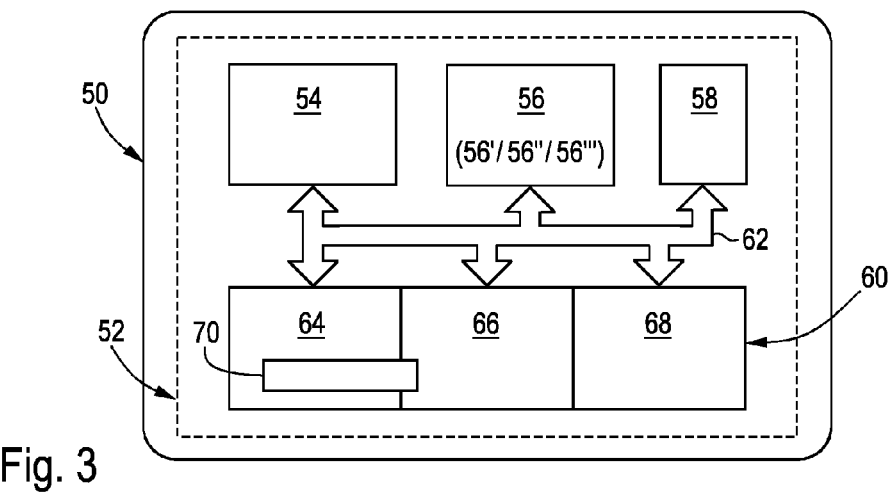
FIG. 3 shows a schematic representation of components of a portable data carrier which is suitable for the execution of the methods of FIG. 1 and FIG. 2.

In some embodiments the method shown in FIG. 1 and FIG. 2 is executed by at least one processor of a portable data carrier. FIG. 3 shows such a data carrier 50 which is configured for example as a chip card or chip module. The data carrier 50 has a microcontroller 52 in which are integrated in a per se known manner a main processor 54, a coprocessor 56, a communication interface 58 and a memory component group 60 on a single semiconductor chip and interconnected via a bus 62.

The memory component group 60 has several memory fields configured in different technologies, which comprise, for example, a read-only memory 64 (mask-programmed ROM), a non-volatile overwritable memory 66 (EEPROM or flash memory) and a working memory 68 (RAM). The methods described herein are implemented in the form of program commands 70 which are contained in the read-only memory 64 and partly also in the non-volatile overwritable memory 66.

The coprocessor 56 of the data carrier 50 is designed for the efficient execution of various cryptographic operations. For the exemplary embodiments described herein it is in particular relevant that the coprocessor 56 supports the Montgomery multiplication with bit-lengths as they are required for cryptographic applications. In most of the configurations, the coprocessor 56 does not support a "normal" modular multiplication, so that such multiplications must be executed with considerably higher effort by the main processor 54.

For natural numbers x, y and an odd natural number m with x, y<m as well as a power of two R with R>m the Montgomery product of x and y modulo m with regard to R is in general defined as follows:

$$x*_{m,R} y := x \cdot y \cdot R^{-1} \bmod m$$

In general, in the present document there is employed, when stating a modulo relation of the form "a=z mod m" the equality sign "=" or the definition sign ":=", in order to express that a is the uniquely defined element from $(z+\mathbb{Z}) \cap [0, \ldots, m[$, for which the modulo relation applies. The notation "a≡z mod m", however, merely expresses that the equivalence modulo m applies.

When the Montgomery parameter R results from the context, in the present document there is often also employed the abbreviated notation $x*_m y$ instead of the detailed notation $x*_{m,R} y$ for the Montgomery product.

Although the above-defined Montgomery multiplication is a modular operation, it can be implemented without division, as this is per se well known and is described e.g. in the article "*Modular multiplication without trial division*" stated at the outset. For a Montgomery multiplication there are required two non-modular multiplications, an auxiliary value previously calculated in dependence on m and R, some additions, and a terminating conditional subtraction from m. These calculations can be efficiently executed by the coprocessor 56.

With currently commercially available microcontrollers 52 there are known configurations of coprocessors 56', 56'', 56''' which execute not exactly the Montgomery multiplication defined above but modifications thereof. The reason for these modifications primarily lies in the fact that the decision, whether the terminating conditional subtraction of the Montgomery multiplication is to be executed, can be optimized in different ways. In general, upon the calculation of the Montgomery multiplication the modified coprocessors 56', 56'', 56''' deliver a result, which potentially differs from the above-defined result by a small multiple of the module m. Further, with the modified coprocessors 56', 56'', 56''' the permissible range of values for the factors x and y is extended such that a calculated result always represents in turn a permissible input value as a factor of the Montgomery multiplication.

More precisely, a first modified coprocessor 56' calculates a first modified Montgomery product $x*'_m y$, which is defined as follows:

$$x*'_m y := (x \cdot y \cdot R^{-1} \bmod m) + k \cdot m$$

Here, $R=2^n$ for certain register sizes n which are multiples of 16. The range of values for the factors x and y is extended to $[0, \ldots, R-1]$, and k is a natural number which is so small so that $x*'_m y < R$ applies.

A second modified coprocessor 56'', however, calculates a second modified Montgomery product $x*''_m y$, which is defined as follows:

$$x*''_m y := (x \cdot y \cdot 2^{-n'} \bmod m) - \epsilon \cdot m$$

The factors x and y are here integers in the range of $-m \leq x, y < m$. There further applies $\epsilon \in \{0, 1\}$, and the exponent n' has the value n'=n+16p for a precision p=1, 2 or 4, a block size c with $160 \leq c \leq 512$, which is a multiple of 32, and a register size n=c·p. For the module m there applies $m<2^n$, and the value R is defined as $R:=2^{n'}$.

A third modified coprocessor 56''' finally calculates a third modified Montgomery product $x*'''_m y$, which is defined as follows:

$$x*'''_m y := (x \cdot y \cdot 2^{-t \cdot c} \bmod m) + \epsilon \cdot m$$

The factors x and y are here natural numbers with $x<2^{t \cdot c}$, $y<2 \cdot m$. There further applies $\epsilon \in \{0, 1\}$. The block size c is fixed and amounts to c=128. The register size for the factor x amounts to t·c. The register size for the other variables is designated by n and amounts to a multiple of the block size c. When there applies n=t·c, then the factor x only needs to satisfy the condition $x<\max\{2 \cdot m, 2^n\}$ instead of the condition $x<2^{t \cdot c}$.

The present method is also applicable with other modified coprocessors 56''''.

In the present document, the Montgomery product of two factors x and y with regard to the module m is generally designated by $x*_m y$, when it does not play a role or is indicated through context whether it is exactly the Montgomery product $x*_m y$ of the coprocessor 56 according to the originally stated definition or one of the three modified Montgomery products $x*'_m y$ or $x*''_m y$ or $x*'''_m y$ of one of the coprocessors 56', 56'', 56'''.

In general, each "normal" modular multiplication x·y=z mod m can be replaced by a Montgomery multiplication $x'*_m y'=z'$, when the input values x, y first are converted, by means of respectively one Montgomery transformation, into their corresponding Montgomery representations x', y' and then the result value is inversely transformed from its Montgomery representation x' into the value x. The Montgomery transformation can be effected for example by the calculation x':=x·R mod m. Upon the inverse transformation, the result $z:=z' \cdot R^{-1}$ mod m can be efficiently determined by a Montgomery multiplication with the factor 1, i.e. by the calculation $z:=z'*_m 1$.

Because of the required forward and inverse transformations it is normally not efficient to replace one single modular multiplication by a Montgomery multiplication. But when several multiplications are to be executed successively—as this is the case for example with a modular exponentiation —, then these multiplications can be carried out completely in the Montgomery number range. Then only one single forward transformation at the beginning of the calculation sequence and one single inverse transformation at the end of the calculation sequence is necessary.

According to the just-described principle, in the method shown in FIG. 1 and FIG. 2 some or all modular multiplications can be implemented as Montgomery multiplications. It is to be understood, that calculation segments which are effected in the Montgomery number range are to be combined here, if possible, in order to reduce the number of required forward and inverse transformations. Additions and subtractions can be executed in the "normal" number range and in the Montgomery number range without difference.

The employment of Montgomery multiplications is particularly advantageous, when the data carrier 50 has a coprocessor 56, 56', 56", 56''' which supports the Montgomery multiplication but not the normal modular multiplication. Even when the coprocessor 56, 56', 56", 56''' supports both multiplication types, the Montgomery multiplication is often executed more efficient. Depending on the number of required transformations—in particular on the forward transformations which are more elaborate in comparison to the inverse transformations—there results a considerable saving even when a Montgomery multiplication should be executed only slightly more efficient than a normal modular multiplication.

In the exemplary embodiments described here, the method shown in FIG. 1 and FIG. 2 is optimized in particular with regard to the Fermat tests executed in the steps 12 and 28. It is to be understood that the configurations of an efficient Fermat test, as they are described in the following, are not restricted to the method course according to FIG. 1 and FIG. 2, but that they are provided also for other application purposes in alternative embodiments in which a prime number test is performed.

As already mentioned above, upon the Fermat test it is checked whether the relation $a^m \equiv a \bmod m$ applies to a prime number candidate m and a natural number a. Alternatively, the relation $a^{(m-1)} \equiv 1 \bmod m$ can also be checked, which causes a slightly smaller computing expenditure. As a further alternative there can be checked, whether the relation $a^{m'} \equiv \pm 1 \bmod m$ (also: $m'=(m-1)/2$) applies to the value m' which results from the odd prime number candidate m (and thus from the even value m−1) through a shift by one binary digit to the right.

In the three stated cases, a calculation of the power modulo m must be executed with an integer and positive exponent which either is as long as m or one binary digit shorter than m. When the per se known square-and-multiply-method is employed for this, the computing expenditure for such a calculation of the power is proportional to the third power of the length of m.

In one exemplary embodiment of the method according to FIG. 1 and FIG. 2 there may for example be necessary, as already mentioned, on average about 40 Fermat tests for the determination of each of the two prime numbers p and q for an RSA key having 2048 bits. In practice this means that a large portion of the total computing time of the method according to FIG. 1 and FIG. 2 is spent for the Fermat tests in the steps 12 and 26. This ratio does not change with other RSA key lengths either, because the average number of required Fermat tests rises linearly with the bitlength of the RSA key.

In the exemplary embodiments described here the Fermat test upon the employment of Montgomery multiplications is optimized. In so doing, as a base a—in a notation of the exponentiation with a positive and integer exponent—there is employed a fractional value with a power of two in the denominator, for example the value $(2m+1)/2 = \frac{1}{2} \bmod m$. By these measures, the computing expenditure for a Fermat test can be reduced by a quarter, compared with an implementation in which the calculation of the power of the Fermat test to an arbitrary base a is effected by means of a square-and-multiply-method. The details of the exponentiation by means of Montgomery operations is explained later.

Figure 4:
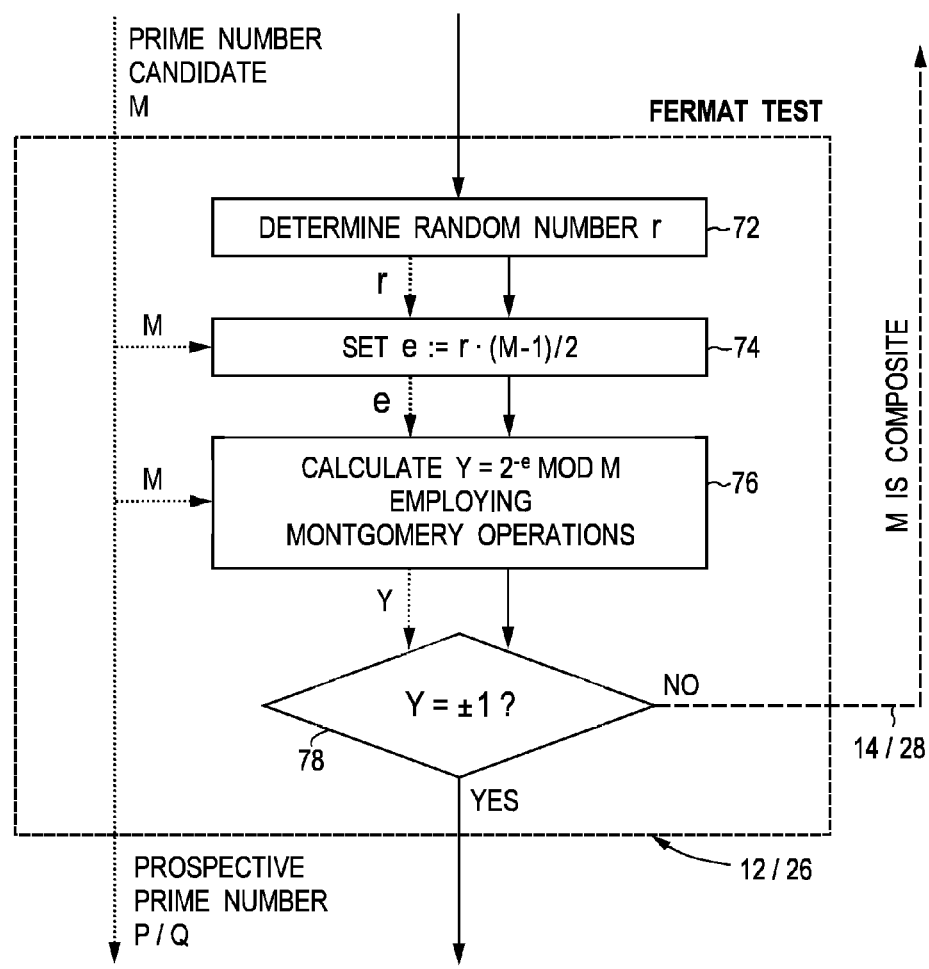
FIG. 4 shows a flow diagram of a method for the execution of a Fermat test.

FIG. 4 shows an exemplary implementation of the Fermat test, as it is executed in come configurations in the steps 12 and 26 of FIG. 1. As already mentioned, upon the Fermat test there is effected a calculation of the power with an exponent e which depends on the prime number candidate m to be kept secret. Thus, also the exponent e must be kept secret. In particular side channel attacks, such as e.g. DPA attacks, in which information about a plurality of calculation sequences is collected and statistically evaluated, are to be made more difficult. It is thus provided in the exemplary embodiment shown in FIG. 4 to mask the exponent e by means of a small random number r. For this purpose, in step 72 a suitable random number r is determined, and in step 74 the exponent e is determined as the product of the masking number r having the value (m−1)/2, which corresponds to the prime number candidate m shifted by one binary digit to the right.

The masking of the exponent slightly reduces the informative power of the Fermat test, but it has, besides the increased protection against spying still one further advantage which is explained later.

In step 76, then the calculation of the power with the base ½ is carried out, and in step 78 it is checked whether the result has the value±1. If this is the case, the Fermat test is successfully completed. Otherwise, the return 14 or 28 to the selection of a new prime number candidate is effected.

As represented in FIG. 4, the calculation of the power in step 76 is executed employing Montgomery operations—these are understood to be in particular Montgomery multiplications and Montgomery squarings. Several variants of a suitable method are described in the following. For a better understanding, first a comparison method is represented, however, which employs "normal" modular multiplications $a *_M b := a \cdot b \bmod M$—as they are executed for example by the main processor 54 of the data carrier 50 or by a suitable coprocessor. In the comparison method, the exponentiation is executed by means of the already mentioned square-and-multiply-technique, in which there is effected for each bit of the exponent a squaring of an intermediate result and—in dependence on the value of the exponent bit—further a multiplication of the intermediate result with the base to be exponentiated.

It is provided in the comparison method to execute the Fermat test with the base a=2. The multiplications of the square-and-multiply-technique are then merely duplications of the intermediate result and can be implemented by a shift of the intermediate result by one bit to the left. The effort for this is negligible. The effort for the squarings does not change by selecting the base 2. Since a random number requires on average approximately twice as many squarings than multiplications, the effort for a Fermat test decreases by a third when the base 2 is employed.

The just-described comparison method, however, is potentially susceptible to side channel attacks, when by measuring the current consumption or other parameters of the data carrier 50 there can be detected, whether or not upon the processing of a bit of the exponent the intermediate result is duplicated—i.e. is shifted to the left. Some coprocessors make available special commands which avoid such attacks. If no suitable commands are available, a modification of the comparison method is proposed here, which could be referred to as "square-eight times-and-multiply-once-method".

With the just-stated modification respectively eight squarings are executed, but the pertinent potential multiplications are combined to respectively one single multiplication. The exponent bits for the deferred multiplications are respectively collected in a byte $e_i$, and the multiplication carried out is then effected with the factor $2^{e_i}$. Altogether, this method can be described with the following pseudocode notation:

| Method 1 | |
|---|---|
| Input values: | Exponent $e = e_0 + e_1 \cdot 256 + ... + e_n \cdot 256^n$ module in the register M |
| Register: | M, X, Y |
| Output value: | Power $2^e$ mod M in register Y |
| Method course: | |
| SET $Y = 2^{e_n}$ | (1.1) |
| FOR i = n−1 COUNTING DOWN TO 0 | (1.2) |
|   EXECUTE 8 TIMES | (1.3) |
|     SET Y *= Y mod M | (1.4) |
|   END | (1.5) |
|   SET $X = 2^{e_i}$ | (1.6) |
|   SET Y *= X mod M | (1.7) |
| END | (1.8) |

In the pseudo notation above, the notation A*=B mod M means that the content of the register A is replaced by A·B mod M. The registers M, X and Y respectively have a size of at least 256 bits. The values $e_i$ represent for $0 \le i \le n$ the "digits" of the exponent e in a place value system with the base 256; thus $0 \le e_i \le 255$ applies.

In line (1.1) there is effected the initialization of the register Y. For each byte of the exponent e a loop iteration is then executed, which respectively comprises the lines (1.3)-(1.7). In so doing, in the lines (1.3) and (1.4) the content of the register Y is squared eight times. In the lines (1.6) and (1.7) there is effected a multiplication of the intermediate result in the register Y with the factor $2^{e_i}$. The calculations of the power in the lines (1.1) and (1.6) can be executed efficiently by e.g. for the calculation of $A=2^{e_k}$ first the register A being set to zero, and then the (k+1)-th bit—calculated from the lowest-order bit—being inverted to a "1".

The above method 1 is secure against side channel attacks, if multiplications with different powers of two cannot be distinguished by an attacker. If this method is used for a Fermat test with the base 2, this can reduce the computing expenditure—compared with a Fermat test, in which the calculation of the power is effected to an arbitrary base a—by a quarter.

The inventor has recognized, that the method 1 just described can be developed such that it employs Montgomery multiplications and is thus efficiently executable on data carriers 50 having suitable coprocessors 56, 56', 56", 56'''. Surprisingly, this is possible with relatively few modifications of the method course. In particular, in the developed method, which is referred to as "method 2" in the following, a negative power of two is calculated as a result, i.e. $2^{-e}=(1/2)^e$ instead of the value $2^e$ calculated in the method 1. Further, in method 2 there is provided an additional step, in which the exponent e is suitably recoded, in order to compensate the employment of the Montgomery operations instead of the "normal" modular multiplications and squarings in method 1.

Like in the method 1, in method 2 there are employed two registers X and Y as well as a constant third register M for the module m. The register Y has the same size as M, while the register X may be smaller, where applicable. All three registers have at least 256 bits, and the module m amounts to at least $2^{255}$.

The method 2 is employable for all the above-stated coprocessors 56, 56', 56", 56'''. This universality is achieved in that the method employs only two generic Montgomery commands, which are available on all usual platforms. These commands are, firstly, the Montgomery squaring of the register Y and, secondly, the Montgomery multiplication of the registers X and Y. Upon the Montgomery squaring the value of the register Y is replaced by $Y*_{m,R}Y$. This Montgomery squaring is expressed in the following by the pseudocode command "SET $Y*=Y*R^{-1}$ mod M". The Montgomery multiplication, upon which the value of the register Y is replaced by $X*_{m,R}Y$, is expressed in the following by the pseudocode command "SET $Y*=X*R^{-1}$ mod M".

Further, in the method 2 a register (either X or Y) of the width r with a power of two $2^k$ is initialized with $0 \le k < r$. This process is expressed by the pseudocode command "SET $Z=2^k$". The method 2 can then be described as follows:

| Method 2 | |
|---|---|
| Input values: | Exponent $e = e_0 + e_1 \cdot 256 + ... + e_n \cdot 256^n$ module in the register M |
| Register: | M, X, Y |
| Output value: | Power $2^{-e}$ mod M in register Y |
| Method course: | |
| EXECUTE "METHOD 3" | (2.0) |
| (Generates from exponent e a recoded exponent f with $f = f_0 + f_1 \cdot 256 + ... + f_n \cdot 256^n$) | |
| SET $Y = 2^{f_n}$ | (2.1) |
| FOR i = n−1 COUNTING DOWN TO 0 | (2.2) |
|   EXECUTE 8 TIMES | (2.3) |
|     SET $Y*=Y*R^{-1}$ mod M | (2.4) |
|   END | (2.5) |
|   SET $X = 2^{f_i}$ | (2.6) |
|   SET $Y*=X*R^{-1}$ mod M | (2.7) |
| END | (2.8) |

Except for the preparing step in line (2.0), the structure of the method 2 corresponds exactly to the structure of method 1. After the initialization of the register Y in line (2.1) again a loop is executed with the lines (2.3)-(2.7) as a loop body. In the lines (2.3) and (2.4), here a Montgomery squaring, repeated eight times, of the intermediate result in the register Y is executed, and in the lines (2.6) and (2.7) there is effected a Montgomery multiplication of the register Y with the factor $2^{f_i}$. The methods 1 and 2 merely differ in the recoding of the exponent in step (2.0) and in that Montgomery multiplications and Montgomery squarings are employed instead of normal modular multiplications and squarings.

In a modification of the above-described method 2 the two lines (2.6) and (2.7) can be combined into one single command, in which the value of the register Y is replaced by the product $Y \cdot 2^{f_i - n'}$ mod M; here, n' is the binary logarithm of the Montgomery parameter R, so that $R=2^{n'}$ applies. In the pseudo notation employed here, this combined command could be expressed with "SET $Y*=2^{f_i}*2^{-n'}$ mod M".

For some of the coprocessors 56, 56', 56", 56''' that are treated here the result of the method 2 might deviate by a small multiple of the module M from the desired final result $2^{-e}$ mod M. It may therefore be necessary to execute as a terminating correction step a modular reduction of the register Y modulo M.

In the exemplary embodiment described here, the recoding of the exponent e in line (2.0) is effected according to the following method:

| Method 3 | |
|---|---|
| Input values: | Exponent $e = e_0 + e_1 \cdot 256 + ... + e_n \cdot 256^n$ Logarithm n' of the Montgomery parameter R to the base 2 (therefor $R = 2^{n'}$) applies |
| Output value: | Recoded exponent f with $f = f_0 + f_1 \cdot 256 + ... + f_n \cdot 256^n$ for employment in method 2 |
| Method course: | |
| SET $f = n' \cdot (256 + 256^2 + 256^3 + ... + 256^n) - e$ | (3.1) |
| STORE $f_0, f_1, ..., f_n$ | (3.2) |
| WITH $f = f_0 + f_1 \cdot 256 + ... + f_n \cdot 256^n$ | (3.3) |
| AND $0 \le f_i < 256$ FOR $0 \le i < n$ | (3.4) |

With the following argumentation it can be illustrated that the method 2 with the recoding of the exponent e according to method 3 yields the correct result: First it is to be noted that during the method course all the values in the registers X and Y are always modular powers of two (with module M), because the registers with powers of two are initialized, and because the Montgomery operations can be written as modular multiplications with (where applicable, negative) powers of two as factors. The executed calculations can thus be written more clearly in the form of their logarithms to the base 2 with regard to the module M.

For $Y=2^y$ and $R=2^{n'}$ the Montgomery squaring in line (2.4) can be written as a duplication and subtraction, in which y is replaced by $2 \cdot y - n'$ (operation "S"). The combined operation from the lines (2.7) and (2.8), which can be written on the register level as "SET $Y^*=2^k*2^{-n'}$ mod M", in the logarithmic representation replaces y by $y+k-n'$ (operation "$M_k$").

In method 2, the operation S is respectively executed eight times and then the combined operation $M_k$ once. In the logarithmic notation this method course can be represented as follows:

$$y \to S2 \cdot y - n' \to S4 \cdot y - 3 \cdot n' \to S8 \cdot y - 7 \cdot n' \to S \ldots \to S256 \cdot y - 255 \cdot n' \to M_k 256 \cdot (y-n') + k$$

To represent a suitable recoding of the exponent e, the bytes $f_n, f_{n-1}, \ldots, f_0$ of the recoded exponent f must have the property that the sequence defined in the following $y_n, y_{n-1}, \ldots, y_0$ yields the result $y_0 = -e$; the composition of functions is expressed by the symbol "∘":

$$y_n := f_n$$

$$y_i := M_{fi} \circ S^8(y_{i+1}) = 256 \cdot (y_{i+1} - n') + f_i \text{ for } i=n-1, \ldots, 0$$

By induction over n there can be shown that the recoding defined in method 3 has the just-mentioned property and thus leads to a correct result of the method 2.

Figure 5:
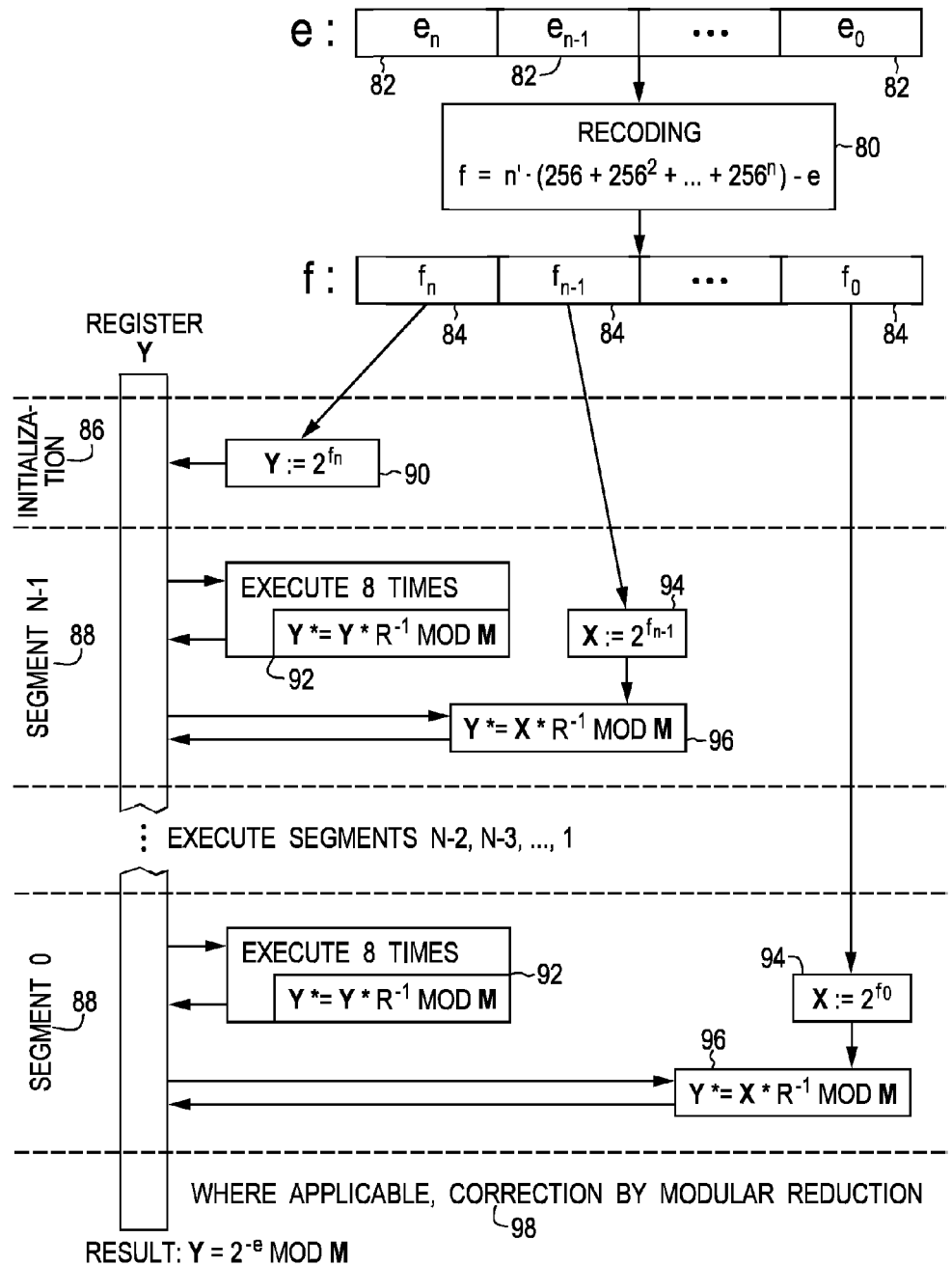
FIG. 5 shows an exemplary course of a method for the modular calculation of the power with the base ½ and a positive and integer exponent e employing Montgomery operations.

FIG. 5 illustrates an exemplary course of the just-described methods 2 and 3. In step 80 the recoding of the exponent e is effected according to method 3, in order to obtain from the original exponent e with its bit groups 82—here the bytes $e_n, e_{n-1}, \ldots, e_0$—the recoded exponent f with its bit groups 84—here the bytes $f_n, f_{n-1}, f_0$.

The method course following after the recoding in step 80 can be divided in an initialization 86 and n segments 88. In the course of the initialization 86, in step 90 the command "SET $Y=2^{f_n}$" according to line (2.1) of the method 2 is executed. Each of the n segments 88 respectively corresponds to a loop iteration of the method 2 and is associated with respectively one of the bit groups 84 of the recoded exponent f.

Each segment 88 has three essential steps 92, 94 and 96. In step 92, according to the lines (2.3) and (2.4) of method 2 there are executed eight Montgomery squarings of the intermediate result contained in the register Y. In step 94, which corresponds to the line (2.6), in the register X there is stored a power of two with an exponent which is formed by the associated bit group 84 of the recoded exponent f. This step 94 can be efficiently implemented by the register X first being deleted and then the one bit, whose bit position is stated by the associated bit group 84, being set to the value "1". Step 96 corresponds to line (2.7) of method 2 and includes a Montgomery multiplication of the registers Y and X.

After altogether n segments 88 having been executed, there is present—after a correction, which might still be required, through a modular reduction in step 98—the desired final result $2^{-e}$ mod M in register Y. This final result is further employed in step 78 in the Fermat test shown in FIG. 4.

In the following, some optional refinements and developments of the hitherto described methods are represented. In different alternative embodiments, different combinations of these refinements and developments can be used in order to for example adapt the methods used particularly well to certain Montgomery coprocessors 56, 56', 56", 56''' or in order to further increase the security against spying.

First, the potential difficulty in the exponent recoding according to method 3 that for $f_n$ a value greater than 255 can occur is dealt with. For a small $e_n$ then, possibly, the value $2^{f_n}$ determined in step (2.1) by method 2 is greater than the module m and thus too great for being stored as an initial value in the register Y. However, in all the Montgomery coprocessors 56, 56', 56", 56''' treated herein, the register size for the module m can be selected such that for the respective Montgomery coefficient n' the inequation $2^{(4/5) \cdot n'} < m < 2^{n'}$ is fulfilled. The condition $2^{f_n} < m$ can then be strengthened for a very small $\epsilon > 0$ as follows:

$$f_n = n' \cdot (256/255) \cdot (1-\epsilon) - e_n \in [0, (\tfrac{1}{5}) \cdot n']$$

The just-mentioned condition is in any case fulfilled when the inequation $\tfrac{1}{4} \cdot n' < e_n < n'$, which is referred to in the following with (*), applies.

If method 3 results in a too great value for $f_n$, this value can be modularly reduced before step 90 of FIG. 5 with the module m, so that then in step 90 the register Y is set to the resulting remainder. For very small $e_n$ ($e_n < n'/256$) it is also possible to take up the n-th segment 82 into the (n−1)-th segment 82. In this case n is reduced by 1, and $e_{n-1}$ is increased by $e_n \cdot 256$. Further, in some configurations it can be provided to select the random number r employed for masking the prime number candidate m in step 74 of FIG. 4 such that the inequation (*) is fulfilled.

For the latter alternative there can for example first be determined, upon the determination of a suitable random number r in step 72 of FIG. 4, a value s such that for a positive integer k the relation $s \cdot ((m-1)/2) \approx (\tfrac{1}{3}) \cdot n' \cdot 256^k$ applies. This can be effected by a short—in some configurations only approximatively executed—division. Then for each number r between s and $2 \cdot s$ results by virtue of the definition $e := r \cdot (m-1)/2$ an exponent e which fulfills the inequation (*). Such a number r is selected randomly and employed as a masking parameter in step 72 of FIG. 4.

The powers of two used in the steps 94 of FIG. 5 or line (2.6) of method 2 have only one single bit set to the value "1". In the steps 96 of FIG. 5 or line (2.7) of method 2 these powers of two serve as factors of respectively one Montgomery multiplication. In some constellations, this could be a starting point for a side channel attack—e.g. an SPA—or template attack —, by which it could be attempted to determine the position of the one "1"-bit.

To increase the security of the method against the just-mentioned possibility of attack, in some configurations it is therefore provided to employ not the values $2^{f_i}$ but the values $m - 2^{f_i}$ as factors of the Montgomery multiplications. Line (2.6) of method 2 can thus be replaced for example by the pseudocode command "SET $X = M - 2^{f_i}$". Because of the modular calculation this changes merely the sign of the intermediate result which is contained in the register Y after the Montgomery multiplication of line (2.7). For the loop iterations with $i = n-1, \ldots, 1$ this additional factor of $-1$ is corrected upon the squarings in line (2.4) of the respectively following loop iteration, however. Merely upon the last loop iteration (i=0) such a correction does not take place; but here the change of the sign has no effect because in step 78 of FIG. 4 it is tested anyway whether register Y has the content±1.

In order to facilitate the calculation of the values $m-2^{fi}$ in the just-described configuration, in an optional development it is provided to request upon the selection of the prime number candidates m in the steps 10 and 24 of FIG. 1 the additional side condition that no prime number candidate m may contain eight or more consecutive bytes with the value "0". This side condition ensures that the carry bit can propagate only by a maximum of 8 bytes upon the subtraction $m-2^{fi}$, so that for this subtraction a method with constant runtime can be employed. Moreover, the just-mentioned side condition increases the security against potential side channel attacks, in which it could be attempted to spy out information about loading or multiplication processes with data blocks having the value 0.

In a further alternative it is provided to employ not the values $2^{fi}$ but the values $m \oplus 2^{fi}$ as factors of the Montgomery multiplications in the steps 96 of FIG. 5 or line (2.7) of method 2, the symbol "$\oplus$" representing the exclusive-or operation. For the reasons explained above, this modification also yields the correct result, because the value $m \oplus 2^{fi}$ modulo m either is equal to $2^{fi}$ or equal to $-2^{fi}$. However, this configuration is not compatible with the restrictions as to the input values of the Montgomery multiplication for all the Montgomery coprocessors 56, 56', 56", 56'".

A further embodiment variant relates specifically to the above-described Montgomery coprocessor 56'", which permits for one of the two factors of the Montgomery multiplication a length that is different from the length of the module. The Montgomery multiplications in the steps 96 of FIG. 5 are executed particularly efficient when the length of the stated Montgomery factor is set to 256 bits. However, then there is the problem of how the single "1"-bit of each value $2^{fi}$ can be effectively masked. In some configurations it is provided to solve this problem in that the module is written in a register of the coprocessor 56'". When the module has an odd number of 128-bit-blocks, the highest-order 128-bit-block is attached.

In these configurations there are employed respectively two 128-bit-blocks as a factor X of the Montgomery multiplications in the steps 96 of FIG. 5, beginning with the highest-order block, the bit corresponding to the value $2^{fi}$ being inverted. Each further loop iteration employs the next two blocks, after the lowest-order block it starts again with the highest-order block.

When the byte length of the module is not a multiple of the double number of 128-bit-blocks of the module, the Montgomery multiplications executed most recently must be treated separately. For example, it can be provided to process the lowest-order bytes of the module without masking. As an alternative there can be executed some additional squaring and multiplication processes, which, however, causes additional computing expenditure. A further alternative, which increases the complexity of the program code, however, consists in superposing several copies of the module. In this case, for the "middle" multiplications the highest-order block or the highest-order blocks of the module are added to the lowest-order block or the lowest-order blocks of the module.

It is to be understood, that the embodiments and embodiment variants are to be seen merely as examples. Further modifications and combinations of the features described herein are immediately obvious to the person skilled in the art.

The invention claimed is:

1. A method for efficiently checking within a data carrier whether a candidate value represents a prime number, for a cryptographic application performed on the data carrier, the data carrier being portable data carrier with limited computing power, the method comprising:
   generating the candidate value by a processor of the data carrier;
   storing the candidate value in a memory unit of the data carrier;
   carrying out a Fermat test by the processor of the data carrier, wherein the Fermat test includes a modular exponentiation of a base with an exponent (e) and a module (m), wherein the exponent (e) and the module (m) respectively depend on the candidate value to be checked, and wherein the modular exponentiation is executed by a coprocessor of the data carrier by employing Montgomery operations, a result of the Montgomery operations being output to the processor,
   wherein the modular exponentiation is expressible as a modular exponentiation with a positive and integer exponent and a base which is a fractional value with a power of two in the denominator,
   wherein the module (m) is identical with the candidate value to be checked, and
   wherein the exponent of the modular exponentiation is recoded, the recoded exponent (f) being the difference of a value dependent on a Montgomery parameter (R) and of the exponent (e) of the modular exponentiation.

2. The method according to claim 1, wherein the modular exponentiation is expressible as a modular exponentiation with a positive and integer exponent and the base ½.

3. The method according to claim 1, wherein the modular exponentiation has several method segments, wherein in each segment respectively several Montgomery squarings of an intermediate result (Y) and exactly one Montgomery multiplication of the intermediate result (Y) with a factor (X) dependent on the exponent (e) of the modular exponentiation are executed.

4. The method according to claim 3, wherein in each segment eight Montgomery squarings of the intermediate result (Y) are executed.

5. The method according to claim 3, wherein the factor (X) of the Montgomery multiplication is determined in dependence on a power of two, whose exponent is formed by a bit group of a recoded exponent (f), wherein the recoded exponent (f) was adapted by a recoding of the exponent (e) of the modular exponentiation to the employment of Montgomery operations.

6. The method according to claim 5, wherein the factor (X) of the Montgomery multiplication is identical to the stated power of two, or that the factor (X) of the Montgomery multiplication is gained from the stated power of two by an operation into which the module (m) enters.

7. The method according to claim 1, wherein the exponent (e) of the modular exponentiation is recoded, in order to obtain a recoded exponent (f) which is adapted to the employment of Montgomery operations upon the modular exponentiation.

8. The method according to claim 1, wherein the exponent (e) of the modular exponentiation is gained from the value to be checked by a shift of the value to be checked to the right and a masking.

9. The method according to claim 1, wherein the method is executed by at least one processor of a portable data carrier.

10. The method according to claim 1, wherein the method serves for the determination of at least one parameter of an RSA key or an RSA-CRT key.

11. A non-transitory computer-readable medium having instructions stored thereon, which, when implemented on a processing unit, cause the processing unit to perform a method for effectively checking within a data carrier whether a candidate value represents a prime number, for a cryptographic application performed on the data carrier, the data carrier being portable data carrier with limited computing power, the method comprising:

generating the candidate value by a processor of the data carrier;

storing the candidate value in a memory unit of the data carrier;

carrying out a Fermat test by the processor of the data carrier, wherein the Fermat test includes a modular exponentiation of a base with an exponent (e) and a module (m), wherein the exponent (e) and the module (m) respectively depend on the candidate value to be checked, and wherein the modular exponentiation is executed by a coprocessor of the data carrier by employing Montgomery operations, a result of the Montgomery operations being output to the processor, wherein the modular exponentiation is expressible as a modular exponentiation with a positive and integer exponent and a base which is a fractional value with a power of two in the denominator, wherein the module (m) is identical with the candidate value to be checked, and wherein the exponent of the modular exponentiation is recoded, the recoded exponent (f) being the difference of a value dependent on a Montgomery parameter (R) and of the exponent (e) of the modular exponentiation.

12. A data carrier having at least one processor and at least one memory, wherein data carrier is configured to efficiently check whether a candidate value represents a prime number, for a cryptographic application performed on the data carrier, the data carrier being portable data carrier with limited computing power, wherein the processor of the data carrier is configured to generate the candidate;

the memory stores the candidate value in a memory unit of the data carrier;

the processor is configured to carry out a Fermat test, wherein the Fermat test includes a modular exponentiation of a base with an exponent (e) and a module (m), wherein the exponent (e) and the module (m) respectively depend on the candidate value to be checked, wherein the modular exponentiation is executed by a coprocessor of the data carrier by employing Montgomery operations, a result of the Montgomery operations being output to the processor, wherein the modular exponentiation is expressible as a modular exponentiation with a positive and integer exponent and a base which is a fractional value with a power of two in the denominator, wherein the module (m) is identical with the candidate value to be checked, and wherein the exponent of the modular exponentiation is recoded, the recoded exponent (f) being the difference of a value dependent on a Montgomery parameter (R) and of the exponent (e) of the modular exponentiation.

* * * * *